March 17, 1964     H. J. MORTON     3,124,997
PHOTOGRAPH CROPPING AND ENLARGEMENT GUIDE
Filed Nov. 7, 1961
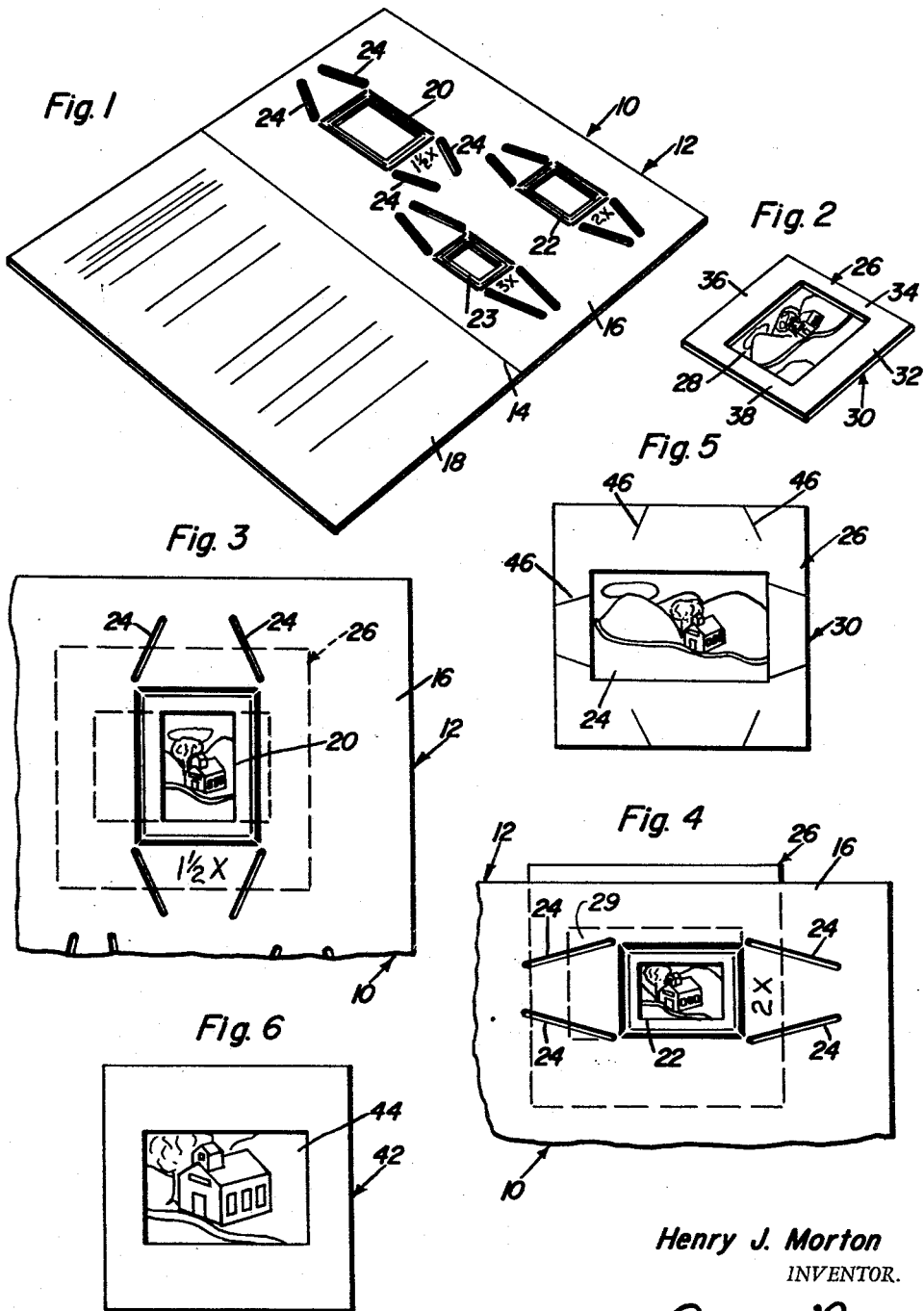
Henry J. Morton
INVENTOR.

United States Patent Office 3,124,997
Patented Mar. 17, 1964

3,124,997
PHOTOGRAPH CROPPING AND ENLARGEMENT GUIDE
Henry J. Morton, East Orange, N.J.
(263 79th St. S., St. Petersburg, Fla.)
Filed Nov. 7, 1961, Ser. No. 150,814
7 Claims. (Cl. 88—24)

This invention relates to a novel and useful photograph cropping and enlargement guide and more specifically to a guide which may be made readily available to substantially all amateur photographers and used to mark transparencies of the type having an open marginal frame work disposed about a film transparency in a manner whereby from such markings a photo enlarging or developing concern may readily ascertain the manner in which transparencies are to be cropped and enlarged.

The main object of this invention is to provide a means whereby an amateur photographer may readily mark a photograph transparency designating the exact manner in which the transparency should be cropped and enlarged. This will enable a photograph enlarging concern to reproduce the desired enlargement without the amateur photographer having to write out a detailed description of the manner in which the cropping and enlarging is to be carried out.

A further object of this invention, in accordance with the preceding object, is to provide a panel-like member including opening means formed therein adjacent an aperture which may be registered with the film transparency to be cropped and enlarged, which opening means may be utilized as a guide for marking the marginal frame work disposed about the film transparency for indicating the size of the enlargement which is to be made and the portion of the transparency which is to be enlarged.

Another object of this invention is to provide a photograph transparency cropping and enlargement guide which may be utilized to designate a selected one of several sizes of enlargement defining areas which may be utilized to indicate exactly how much and where the transparency to be copied is to be cropped.

A final object of this invention to be specifically enumerated herein is to provide a photograph transparency cropping and enlargement guide which will conform to conventional forms of manufacture, can be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the panel-like member of which the cropping and enlargement guide of the instant invention is constructed and showing the various enlargement apertures and cropping slots formed therein;

FIGURE 2 is a perspective view of a conventional form of film transparency with which the cropping and enlargement guide is adapted to be used;

FIGURE 3 is a fragmentary plan view of a portion of the cropping and enlargement guide overlying the transparency of FIGURE 2 and positioned as desired to designate the area of the film transparency which is to be enlarged and showing the cropping and enlargement guide positioned before marking the transparency which is to be enlarged;

FIGURE 4 is a fragmentary plan view similar to that of FIGURE 3 but showing a different manner in which the transparency may be marked for enlargement and cropping;

FIGURE 5 is a plan view of the transparency after being marked in accordance with both ways the cropping and enlargement guide is shown in use in FIGURES 3 and 4;

FIGURE 6 is a plan view of the enlarged and cropped transparency as a result of marking the original transparency in the manner illustrated in FIGURES 4 and 5.

Referring now more specifically to the drawings the numeral 10 generally designates the photograph transparency cropping and enlargement guide of the instant invention. The guide 10 comprises a panel-like member generally referred to by the reference numeral 12 which may be constructed of any suitable material such as fibrous or metallic material. It is to be noted that in most instances the cropping and enlargement guide 12 will be constructed of fibrous material inasmuch as cardboard and the like may be manufactured at a relatively low cost. The cropping and enlargement guides constructed of fibrous material may be for use by photographers desiring to mark transparencies for cropping and enlargement. However, photographic concerns having cropping and enlargement services may wish to be provided with a more durable cropping and enlargement guide and in this instance, the cropping and enlargement guide 10 may be constructed of metallic or plastic material.

As can best be seen from FIGURE 1 of the drawings the panel-like member 12 is provided with a fold line 14 and it will be noted that when the panel member 12 is folded along the fold line 14 it will form an article similar to a leaflet between whose leaves 16 and 18 transparencies marked in accordance with the present invention may be shipped to photographic concerns and establishments offering cropping and enlargement services. In this manner, transparencies to be cropped and enlarged may be conveniently shipped by mail without damage occurring to the transparencies. It is to be noted that the panel-like member 12 will be at least semi-rigid thereby greatly reducing the chances that shipment of the transparencies by mail could result in damage to the transparencies.

The leaf 16 is provided with a plurality of apertures 20, 22 and 23 and it will be noted that a pair of angularly disposed slots 24 are disposed on opposite sides of each of the apertures 20, 22 and 23.

The slots 24 disposed about each aperture are straight and in the order of one-eighth of an inch in width. In addition, it will be noted that the slots 24 about each aperture extend in different directions.

With attention now directed to FIGURE 2 of the drawings there will be seen a conventional form of transparency generally referred to by the reference numeral 26. The transparency 26 includes a film transparency 28 which is supported by means of a rectangular and open marginal frame work generally referred to by the reference numeral 30. The frame work 30 includes sides 32, 34, 36 and 38 and it will be noted that the frame work 30 actually comprises a pair of half frame work numbers which are disposed on opposite sides of and extend beyond the outer peripheral edges of the film transparency 28 and are secured together. In this manner, the film transparency 28 is secured in the marginal frame work 30.

With attention now directed to FIGURE 3 of the drawings it will be noted that the aperture 20 has been registered with the right center portion of the film transparency 28 and that the aperture 20 extends lengthwise exactly the distance between the sides 32 and 36 of the frame work 30. The aperture 20 is utilized to indicate the area of the film transparency 28 which is to be enlarged one and one-half times its normal dimensions.

With attention now directed to FIGURE 4 of the drawings it will be noted that the aperture 22 has been registered with the lower right hand corner of the film transparency 29 and it is to be understood that the aperture 22 designates that portion of the film transparency 28 which is to be enlarged two times its normal dimension.

In both FIGURES 3 and 4 it will be noted that a conventional lead pencil or the like may be utilized and have its point disposed in the slots 24 in order to mark the portion of the frame work 30 disposed beneath the panel 16.

With attention now directed to FIGURE 5 of the drawings it will be seen that the marginal frame work 30 of the transparency 26 has been marked in accordance with the positionings of the leaf 16 in FIGURES 3 and 4.

In FIGURE 6 there will be seen the finished enlarged and cropped transparency which is generally designated by the reference numeral 42. It will be seen that the film transparency 44 of the transparency 42 has been enlarged in accordance with the illustration of the invention in FIGURE 4 of the drawings.

In determining the area of the transparency 30 which is to be enlarged and thus which portion of the film transparency 28 is to be cropped, the enlarger or film technician will take his cropping and enlargement guide and determine which set of slots 24 match with the markings formed on the transparency 30. It will be noted that the angular relationship of the slots 24 and each pair of slots is different and accordingly, the technician may readily determine which aperture has been used to mark the transparency 30.

It will be noted that inasmuch as each of the slots 24 disposed about each of the apertures extends in a different direction, the technician's cropping and enlargement guide may be readily accurately positioned relative to the transparency which is to be cropped and enlarged by matching the marks 46 with the correct sets of slots 24. Any misalignment of the cropping and enlargement apertures with the marked transparency 30 will be readily apparent upon visual ascertation of the manner in which the marks 46 register with the corresponding slots 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A photograph transparency cropping and enlargement guide for use with transparencies of the type having an open marginal framework disposed about a film transparency, said guide comprising a panel-like member having a plurality of apertures formed therein of the same shape but of different sizes corresponding to the shape of the desired finished transparency or print and proportional in size to the enlargement of the original transparency desired, said panel-like member having a set of openings formed therein about each aperture, each set of openings being defined by distinguishing opening boundary defining portions of said panel-like member and adapted to guide a marking tool inserted through said openings along at least some of the marginal framework of said transparency with whose film transparency said aperture has been registered while maintaining said panel-like member and said transparency stationary relative to each other, the opening boundary defining portions of said panel-like member defining different lines of movement for said marking tool adjacent each opening whereby registry of one of said sets of opening-defining portions with the marks on a transparency marginal framework made by a tool guided by the opening boundary defining portions of another set of openings will not be possible.

2. The combination of claim 1, wherein the sides of said apertures are substantially straight.

3. The combination of claim 2, wherein said opening boundary defining portions are straight and extend in different directions.

4. The combination of claim 3, wherein said opening boundary defining portions are disposed on opposite side of said apertures.

5. The combination of claim 1, wherein said openings define slots formed in said panel-like member, said slots being arranged in sets of pairs of slots disposed on opposite sides of each of said apertures.

6. The combination of claim 5, wherein the slots of each of set of slots extends in a different direction.

7. The combination of claim 6, wherein each of said slots is straight and is approximately one-eighth of an inch wide.

References Cited in the file of this patent

UNITED STATES PATENTS

| | | |
|---|---|---|
| 1,403,677 | Fass | Jan. 17, 1922 |
| 1,708,551 | Nell | Apr. 9, 1929 |
| 1,837,704 | Dean | Dec. 22, 1931 |
| 2,061,729 | Draper | Nov. 24, 1936 |
| 2,334,913 | Eisenberg | Nov. 23, 1943 |
| 2,500,782 | Wiklund | Mar. 14, 1950 |